(12) United States Patent
Nakano (10) Patent No.: US 6,321,722 B1
(45) Date of Patent: Nov. 27, 2001

(54) METHOD AND APPARATUS FOR CONTROLLING FUEL INJECTION IN DIESEL ENGINE

(75) Inventor: Futoshi Nakano, Fujisawa (JP)

(73) Assignee: Isuzu Motor Limited, Tokyo (JP)

( * ) Notice: Subject to any disclaimer, the term of this patent is extended or adjusted under 35 U.S.C. 154(b) by 0 days.

(21) Appl. No.: 09/579,685

(22) Filed: May 26, 2000

(30) Foreign Application Priority Data

May 31, 1999 (JP) .................................................. 11-152500

(51) Int. Cl.[7] .............................. B60K 41/24; F02M 51/00
(52) U.S. Cl. ............................. 123/493; 123/326; 477/173
(58) Field of Search ..................................... 123/326, 687, 123/492, 493, 436, 339.22, 339.19; 477/173

(56) References Cited

U.S. PATENT DOCUMENTS 4,515,040 * 5/1985 Takeuchi et al. ..................... 74/866

6,006,724 * 12/1999 Takahashi et al. .

* cited by examiner

Primary Examiner—Erick Solis
(74) Attorney, Agent, or Firm—McCormick, Paulding & Huber LLP (57) ABSTRACT

A first sensor detects whether an engine revolution speed change exceeds a predetermined amount, and a second sensor detects whether an accelerator opening stays within a predetermined range. A controller determines a target amount of fuel injection that is greater than a basic amount of fuel injection when the engine revolution speed change exceeds the predetermined amount and the accelerator opening stays in the predetermined range. The basic amount of fuel injection is determined based on the accelerator opening and engine revolution speed. By feeding a slightly larger amount of fuel than the basic value while an engine brake is applying, the engine revolution speed change is suppressed and shock upon clutch engagement is reduced.

11 Claims, 6 Drawing Sheets

METHOD AND APPARATUS FOR CONTROLLING FUEL INJECTION IN DIESEL ENGINE

BACKGROUND OF THE INVENTION

1. Field of the Invention

The present invention relates to a method and apparatus for controlling an amount of fuel to be injected into a diesel engine, and more particularly to a method and apparatus that can reduce shock upon clutch engagement while an engine brake is applying.

2. Description of the Related Art

Conventionally, a basic amount of fuel injection in a diesel engine is determined based on an engine revolution speed and an accelerator opening, and this basic value is modified based on temperature of water flowing in the engine and/or intake air temperature in order to determine an ultimate (or target) amount of fuel injection.

Incidentally, when a driver is operating a vehicle equipped with a manual transmission, he/she may perform a shift-down operation to the transmission (gear shift-down) while an engine brake is being applying. In this situation, the engine revolution speed often rises steeply upon engagement of a clutch. This results in great change in engine revolution speed. This is primarily caused by negative acceleration due to the engine brake and inertia of the vehicle. As the clutch is engaged, the load on the vehicle is first shifted forward and then shifted backward because of reaction. In other words, back-and-forth oscillation occurs. This results in very fast change in the engine revolution speed, as mentioned earlier. As the engine revolution speed varies rapidly, passengers in the vehicle are forced to move back and forth and experience great uncomfortableness.

SUMMARY OF THE INVENTION

An object of the present invention is to overcome the above described problems.

According to one aspect of the present invention, there is provided an arrangement for controlling fuel injection in a diesel engine, including a sensor for detecting if an engine revolution speed change per unit time exceeds a predetermined amount, another sensor for detecting if an accelerator opening stays within a predetermined range, and a controller for determining a target amount of fuel injection that is greater than a basic amount of fuel injection when the engine revolution speed change exceeds the predetermined amount and the accelerator opening stays in the predetermined range. The basic amount of fuel injection is determined at least based on the accelerator opening and engine revolution speed.

The engine revolution speed change sensor may determine whether the engine revolution speed variation exceeds the predetermined value by comparing a filtered value of engine revolution speed change rate with a threshold value that changes with the engine revolution speed.

The controller may determine the target amount of fuel injection based on at least one of the engine revolution speed and the temperature of water flowing in the engine.

Additional objects and advantages of the present invention will become apparent to those skilled in the art to which the invention relates from the subsequent detailed description and appended claims, taken in conjunction with the accompanying drawings.

DETAILED DESCRIPTION OF THE INVENTION

Now, an embodiment of the present invention will be described in reference to the accompanying drawings.

Figure 6:
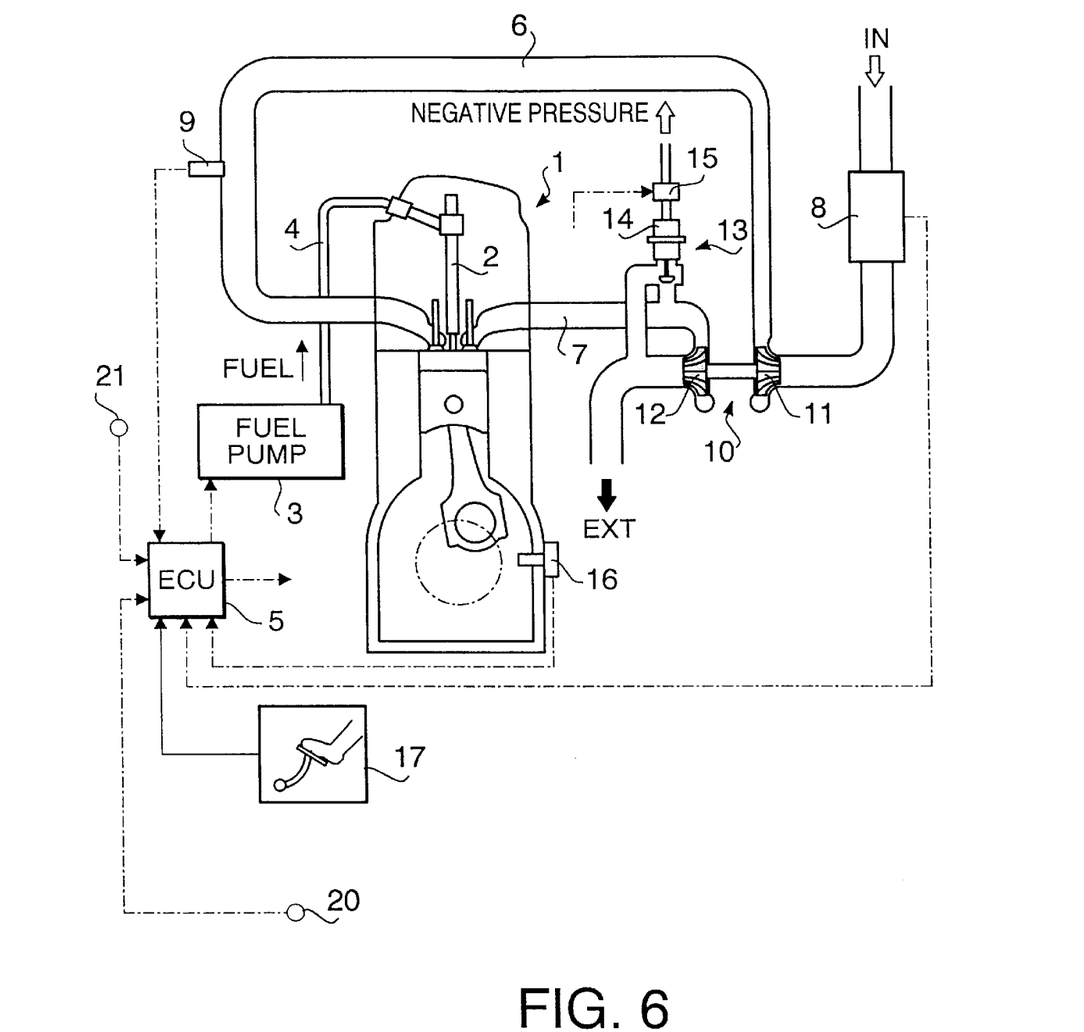
FIG. 6 schematically illustrates an engine equipped with the apparatus of the present invention.

Referring first to FIG. 6, illustrated is a fuel injection system in a diesel engine mounted in a vehicle equipped with a manual transmission. The vehicle also has a manual clutch of friction type, which is disengaged and engaged as a driver stamps and releases a clutch pedal. A diesel engine 1 has at least one fuel injection nozzle 2 for injecting fuel into an associated combustion chamber. For the sake of simplicity, the following description only deals with the fuel injection nozzle 2 illustrated.

The fuel injection nozzle 2 is supplied with pressurized fuel from a fuel injection pump 3 via a pipe 4. The fuel pump 3 is a distribution-type in this particular embodiment. An amount of fuel delivery is determined by an electronic control unit (ECU) 5. The fuel pump 3 has two electromagnetic valves (not shown), which are used to determine the start of fuel delivery and the end respectively. ECU 5 switches these electromagnetic valves such that an appropriate amount of pressurized fuel is fed to the nozzle 2 at an appropriate timing.

An intake air passage 6 extends to the engine 1 and an exhaust passage 7 extends from the engine 1. MAF (mass air flow) sensor 8, which serves as a sensor for detecting an amount of intake air, is provided on the intake air pipe 6 near the inlet of the intake air pipe. An output of the MAF sensor 8 is sent to ECU 5. Accordingly, the amount of intake air can be detected while the engine is operating. It should be noted here that the term "amount of intake air" is a mass flow rate of intake air in this specification. Downstream of the MAF sensor 8 on the intake air pipe 6, provided is an intake air pressure sensor 9. This sensor also outputs its detection result to ECU 5. Accordingly, the intake air pressure can be detected while the engine is running.

The engine 1 is further equipped with a turbocharger 10. A compressor 11 of the turbocharger 10 is attached to the intake air pipe 6 between the MAF sensor 8 and intake air pressure sensor 9. A waste gate 13 is provided on the exhaust pipe 7 upstream of a turbine 12 of the turbocharger 10 to control the exhaust air to be supplied to the turbine 12. The waste gate 13 includes a negative pressure actuator 14 and an electromagnetic valve 15 for feeding or stopping negative pressure (upwardly directing unshaded arrow) to the actuator 14. Based on the output of the intake air pressure sensor 9, the waste gate electromagnetic valve 15 is opened or closed under the control of ECU 5. When the waste gate 13 is opened, the exhaust air from the engine 1 bypasses the turbine 12 and is expelled to the outside as indicated by the shaded arrow EXT.

To ECU 5, connected are an engine revolution speed sensor 16 and an accelerator opening sensor 17.

Accordingly, ECU 5 is able to detect the engine revolution speed and the accelerator opening. ECU 5 is also provided with an output from a clutch switch 20 so that it can determine whether the clutch is engaged or disengaged. The clutch switch 20 is turned on when the driver stamps the clutch pedal, and turned off when the driver releases the clutch pedal. If a play of the clutch pedal is neglected, the clutch is in the disengaged condition when the clutch switch 20 is on whereas it is in the engaged condition when the clutch switch is off. A water temperature sensor 21 is also connected to ECU 5 so that ECU 5 detects the temperature of water flowing in the engine 1.

Figure 5:
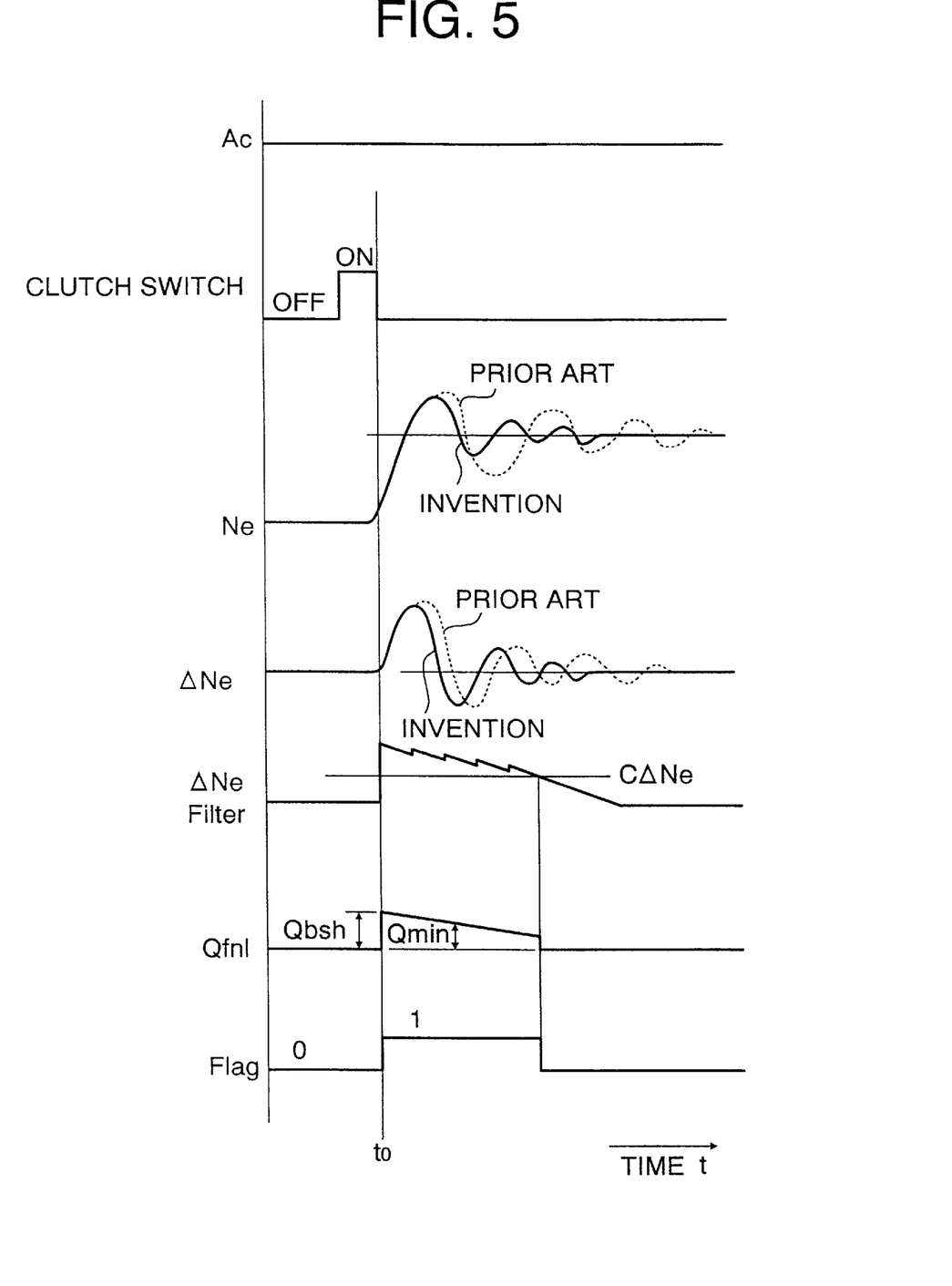
FIG. 5 is timing charts showing relationship between various values utilized in the control of the invention.

Referring now to FIG. 5, illustrated is a timing chart of various parts, switches, values, etc. When the driver performs a shift-down operation while the vehicle is cruising, in order to apply an engine brake, the engine revolution speed Ne steeply rises upon clutch engagement (at the time $t_0$). Reaction to this causes the engine revolution speed Ne to fluctuate for a while. This attenuating fluctuation is referred to as "shift shock", and the present invention aims to suppress this shift shock. The symbol Ac indicates the accelerator opening.

Now, a method and apparatus for controlling the fuel injection to achieve this object will be described.

First, detection of engine revolution speed change will be described. The outline is briefly described first. As illustrated in FIG. 5, a change rate ΔNe of the engine revolution speed Ne is determined, and processed to a filtered value $\Delta Ne_{Filter}$. This value $\Delta Ne_{Filter}$ is compared with a predetermined threshold value CΔNe. If $\Delta Ne_{Filter}$ is greater than CΔNe, it is determined that there is a change in the engine revolution speed. If not, it is determined that there is no change in the engine revolution speed. These detection, computation, comparison and determination are performed in ECU 5 periodically at predetermined control intervals since ECU 5 handles the values in a digitized manner. The engine speed change rate ΔNe is defined by the equation: ΔNe=Ne−Ne(−1). Ne represents a current engine revolution speed and Ne(−1) represents a previous engine revolution speed. The engine revolution speed Ne is detected periodically.

Figure 4:
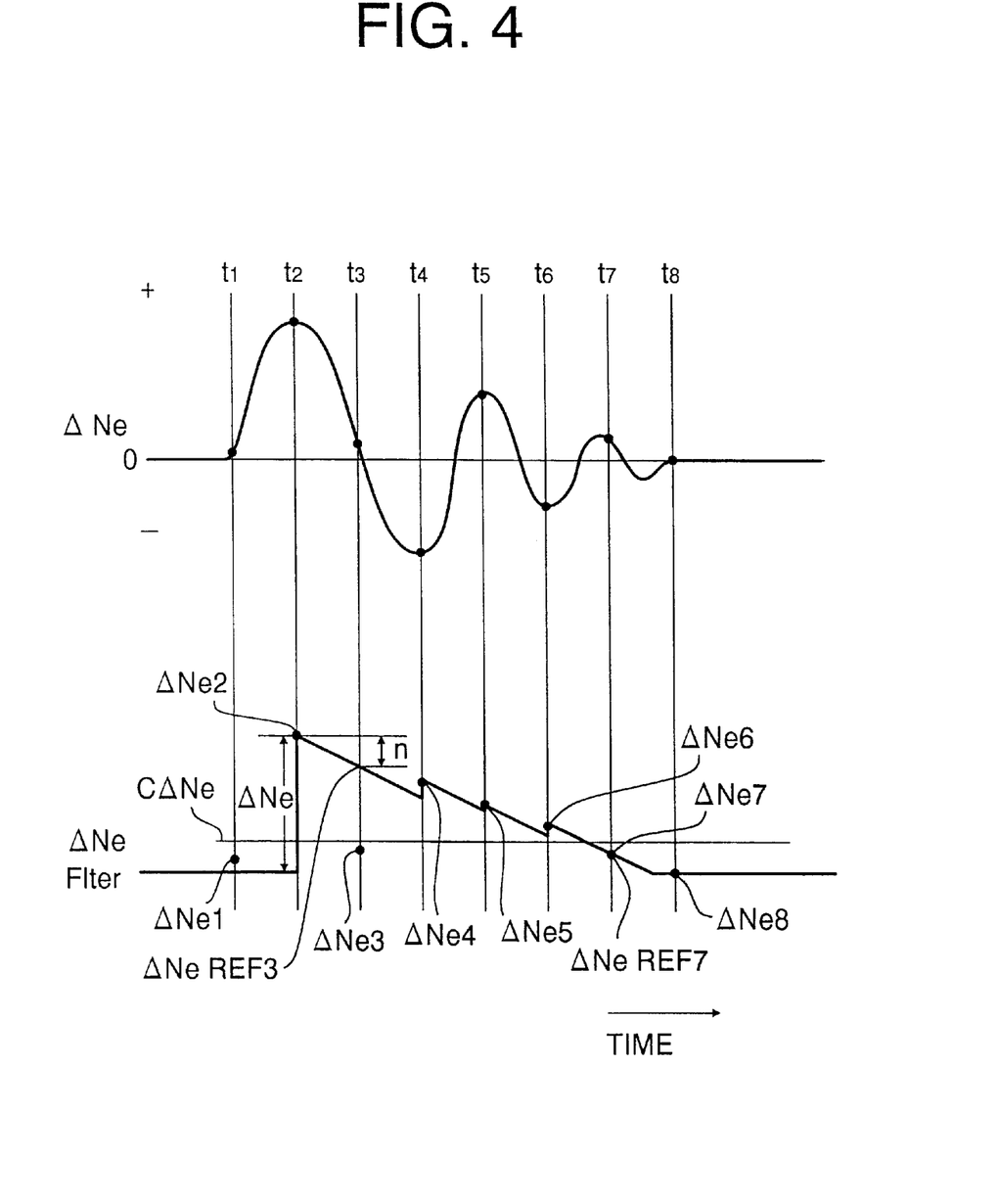
FIG. 4 illustrates timing charts used to detect engine revolution speed change according to the present invention.

Next, referring to FIG. 4, determination of the filtered value $\Delta Ne_{Filter}$ will be described. In this drawing, t1, t2, ..., t8 indicate the moments when ECU 5 makes the detection, comparison, computation, and determination. It should be assumed that the engine speed change rate ΔNe varies due to the engine revolution speed change. Absolute values $\Delta Ne_1, \Delta Ne_2, \ldots, \Delta Ne_8$ of the speed change rates ΔNe at t1, t2, ..., t8 are plotted on the $\Delta Ne_{Filter}$ line.

At the time t1, $\Delta Ne_1$ is smaller than CΔNe. Therefore, it is determined that there is no engine revolution speed change. At the time t2, $\Delta Ne_2$ is greater than CΔNe. Thus, it is first determined at the time t2 that there is engine revolution speed change. In this case, $\Delta Ne_2$ is used as the filtered value $\Delta Ne_{Filter}$.

The engine speed change rate ΔNe continuously changes so that the absolute value of ΔNe becomes occasionally smaller than CΔNe even though there is engine revolution speed change, for example at the time t3. It is inconsistent to the actual phenomena if ECU 5 determines that there is no revolution speed change at such occasion. In the present invention, therefore, determination is made in the following manner once the revolution speed change is determined.

At the time t2, $\Delta Ne_{Filter}=\Delta Ne_2$ is established, and then at the next time t3, a certain value n is extracted from the previous value $\Delta Ne_{Filter}(=\Delta Ne_2)$ to obtain a reference value $\Delta Ne_{REF3}$; $\Delta Ne_{REF3}=\Delta Ne_2-n$. Then, $\Delta Ne_{REF3}$ is compared with $\Delta Ne_3$ to take the larger one ($\Delta Ne_{REF3}$) as the current $\Delta Ne_{Filter}$. In this manner, the filtered value $\Delta Ne_{Filter}$ is made greater than CΔNe, and accordingly ECU 5 can determine that there is revolution speed change.

In a similar manner, at the following times t3, t4, ..., the value n is subtracted from $\Delta Ne_{Filter}$ each time to obtain a new reference value $\Delta Ne_{REF}$, and it is compared with the present ΔNe. The larger one is then taken as $\Delta Ne_{Filter}$, and compared with CΔNe. Eventually, at the time t7, both $\Delta Ne_7$ and $\Delta Ne_{REF7}$ become lower than CΔNe. At this point, it is first determined that the revolution speed change no longer exists.

As described above, in the present invention, determination is made to match the actual phenomena (actual change of the engine speed change rate ΔNe). The reason why the value n is subtracted from $\Delta Ne_{Filter}$ every time the determination is made is because the amplitude of the actual change rate ΔNe diminishes as the time goes by.

Next, detection of shift shock will be described in connection with the above described revolution speed change detection.

Figure 3:
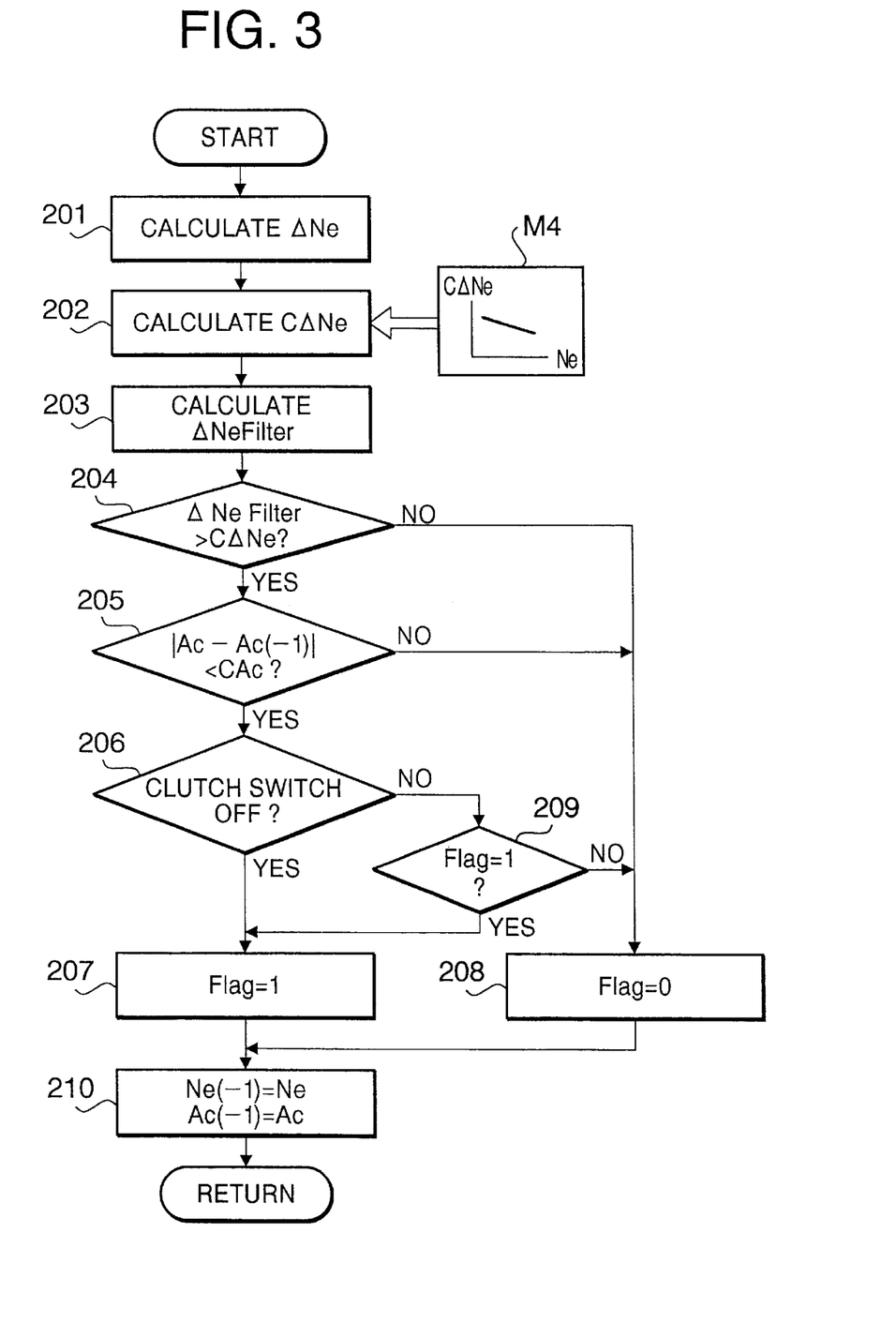
FIG. 3 illustrates a flowchart utilized in determining whether shift shock occurs or not according to the present invention.

Referring to FIG. 3, the shift shock detection is executed according to the flowchart illustrated. ECU 5 at the first step 201 subtracts the previous engine revolution speed Ne(−1) from the current engine revolution speed Ne to calculate the engine revolution speed change rate ΔNe(Ne−Ne(−1)). At the next step 202, ECU obtains the threshold value CΔNe from a map M4 based on the current engine revolution speed Ne. The map M4 is prepared beforehand from experiments or theoretical computations, and stored in ECU 5. As illustrated, the threshold value C ΔNe varies with the engine speed Ne; the threshold value has a low value when the engine speed Ne is high.

At the step 203, the filtered value $\Delta Ne_{Filter}$ is obtained according to the method as described earlier. This filtered value is then compared with the threshold value CΔNe at the next step 204. If $\Delta Ne_{Filter}$ is smaller than or equal to CΔNe, the program proceeds to step 208 to establish that a shift shock flag is not raised (Flag=0).

On the other hand, if $\Delta Ne_{Filter}$>CΔNe, then the program proceeds to step 205 to compare the absolute value |Ac−Ac(−1)| obtained by subtracting the previous accelerator opening Ac(−1) from the current accelerator opening Ac with the predetermined accelerator opening change threshold value CAc. Here, it is determined if the change of the engine revolution speed Ne is caused by the accelerator pedal movement (stamped or released). If the engine revolution speed change is caused by the driver's foot stamping/releasing the accelerator pedal, the control of the present invention should not be performed. To this end, when |Ac−Ac(−1)|≧CAc is true, the program advances to step 208 to set the shift shock flag to be 0.

If |Ac−Ac(−1)|<CAc, the program proceeds to step 206 to determine whether the clutch switch 20 is off (i.e., the clutch is engaged). If the clutch switch is off, ECU 5 determines that there is shift shock. Accordingly, the program goes to step 207 to set the shift shock flag to be 1. On the other hand, if the clutch switch is on (i.e., the clutch is disengaged), the program proceeds to step 209 and determines whether Flag=1 is already established. If the answer is No, then the program proceeds to step 207 and sets the flag to be 0. Subsequently, at step 210, the current engine revolution speed Ne and accelerator opening Ac are changed to the previous values Ne(−1) and Ac(−1) for the next routine of control. In this manner, one routine of control ends.

When Flag=1 is already established, the situation of Flag=1 is maintained, even if the clutch is in the disengaged condition (steps 206, 209 and 207). This is because as long as there is revolution speed change, the revolution speed change suppression control should be continuously performed although the clutch is disengaged and the passages do not feel uncomfortable. Specifically, once the flag is raised, the suppression control continues until the revolution speed change disappears.

Figure 1:
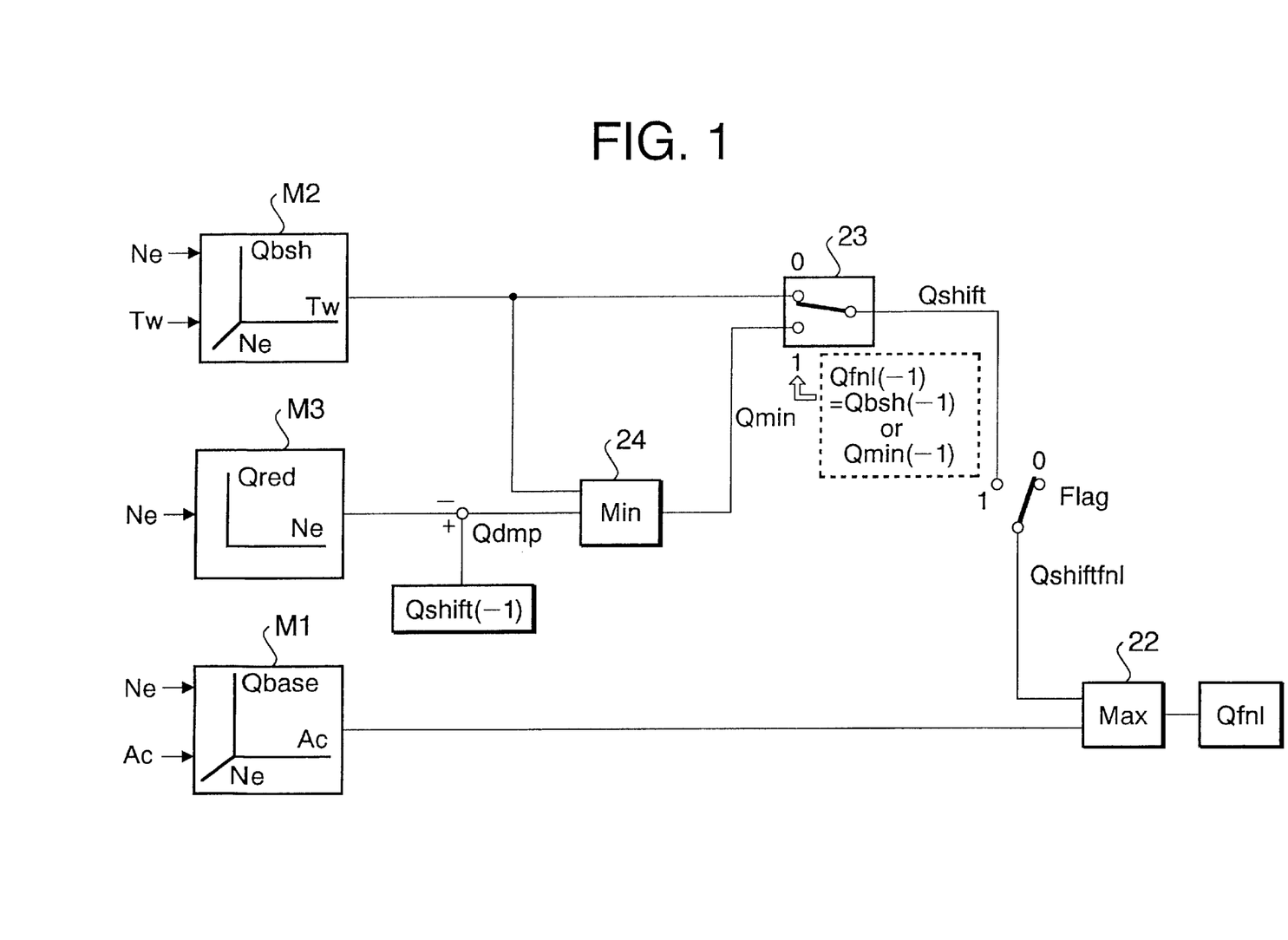
FIG. 1 illustrates a block diagram of various elements in an apparatus of the present invention, which is useful to explain fuel injection control according to the present invention.
Figure 2:
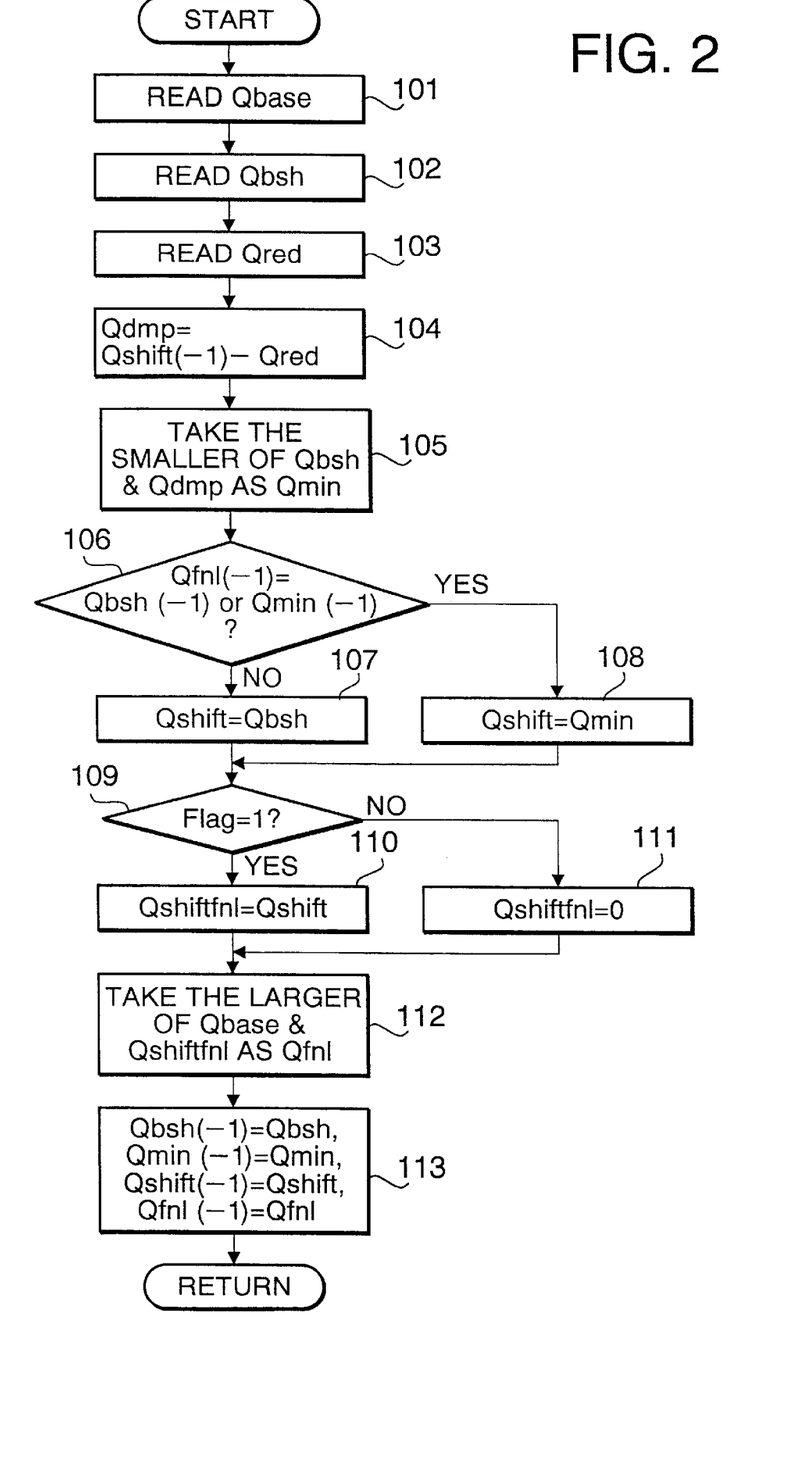
FIG. 2 illustrates a main flowchart corresponding to the block diagram shown in FIG. 1.

Now, determination of target amount of fuel injection by the apparatus of the invention will be described. FIG. 1 illustrates a block diagram of parts and maps related to this control and FIG. 2 illustrates the flowchart of the same control. In other words, FIGS. 1 and 2 illustrate the substantially the same thing.

Referring to FIG. 1, three maps M1, M2 and M3 are stored in ECU 5. These maps are prepared beforehand from experiments and/or theoretical computations. The map M1 is a three-dimensional map to determine a basic amount of fuel injection $Q_{base}$. The basic amount of fuel injection is uniquely determined from the engine revolution speed Ne detected by the engine speed sensor 16 and the accelerator opening degree Ac detected by the accelerator sensor 17. This way of determining the basic amount of fuel injection using a map is common in the technical field of fuel injection control. Further, it is conventional to amend the basic amount of fuel injection $Q_{base}$ with the engine water temperature and/or intake air temperature. For the sake of simplicity, in this particular specification, however, such amendment is not performed.

The map M2 is also a three-dimensional map to primarily determine an amount of first fuel injection $Q_{bsh}$ after the engine revolution speed change occurs (see the curve $Q_{fnl}$ in FIG. 5). This amount of first injection $Q_{bsh}$ is uniquely determined from the engine speed Ne and the water temperature Tw detected by the water temperature sensor 21.

The Map3 is a two-dimensional map to determine the subtraction value $Q_{red}$, which is a value utilized in a subtracting calculation made to the amount of fuel injection in the revolution speed change suppression control. The value $Q_{red}$ is uniquely determined from the engine speed Ne.

As depicted, when the shift shock flag is not raised (Flag=0) (i.e., in the case of no shift shock), the basic amount of fuel injection $Q_{base}$ is identical to the ultimate (target) amount of fuel injection $Q_{fnl}$. A comparator 22 chooses a larger one from the two inputs $Q_{base}$ and $Q_{shiftfnl}$. Since Flag=0 and $Q_{shiftfnl}=0$, $Q_{base}$ is output from the comparator 22 and becomes $Q_{fnl}$.

From this situation, it should be assumed that the shift shock occurs and the shift shock flag is raised (Flag=1). First, a switchover element 23 takes a value 0 (the reason will be described later) so that the amount of first fuel injection $Q_{bsh}$ becomes the output $Q_{shift}$ of the element 23. Then, the output becomes $Q_{shiftfnl}$ and is input to the comparator 22. Another input to the comparator 22 is $Q_{base}$, which is smaller than $Q_{bsh}$ since currently the engine brake is applying and the accelerator opening degree Ac is almost zero. Accordingly, the first amount of fuel injection $Q_{bsh}$, which is obtained by adding a certain value to the basic amount of fuel injection $Q_{base}$ and therefore greater than it, becomes the ultimate (or target) amount of fuel injection $Q_{fnl}$.

The condition for switching the switch 23 to "1" is either the amount of previous target fuel injection $Q_{fnl}(-1)$ is identical to the amount of previous first fuel injection $Q_{bsh}(-1)$ or it is identical to the amount of previous minimum fuel injection $Q_{min}(-1)$ (will be described later). Since $Q_{bsh}=Q_{fnl}$ is established, the switch 23 takes "1" for a while.

In the second routine of control after the shift shock determination, the amount of first fuel injection $Q_{bsh}$ is input to a second comparator 24. Another input to this comparator 24 is an amount of reduced fuel injection $Q_{dmp}$. This value $Q_{dmp}$ is obtained by subtracting the value $Q_{red}$ from the previous output $Q_{shift}(-1)$ of the switch 23, i.e., the amount of previous first fuel injection $Q_{bsh}$. Among these two inputs, this comparator 24 outputs the smaller one as the minimum amount of fuel injection $Q_{min}$. In most cases, $Q_{dmp}<Q_{bsh}$ is established so that $Q_{dmp}$ becomes $Q_{min}$. This in turns results in $Q_{shift}$ and $Q_{shiftfnl}$. Since the subtraction value $Q_{red}$ is a small value, the relationship of $Q_{shiftfnl}>Q_{base}$ is still established in the comparator 22. Thus, $Q_{shiftfnl}(=Q_{dmp})$ becomes the target amount of fuel injection $Q_{fnl}$.

In this manner, the target amount of fuel injection again takes a value greater than the basic amount of fuel injection $Q_{base}$. Since $Q_{min}=Q_{fln}$, the switch 23 still takes "1" in the next routine of control.

In the subsequent control, as long as Flag=1 is established, the target amount of fuel injection $Q_{fnl}$ is determined in the same manner as described above. As a result of subtracting the value $Q_{red}$ in each routine of control, the target amount of fuel injection $Q_{fnl}$ is gradually decreased from the starting value $Q_{bsh}$ as the time passes (see the curve $Q_{fnl}$ in FIG. 5). However, the value $Q_{fnl}$ is still greater than the basic value $Q_{base}$.

What is meant by this will be described below. When the engine brake is applying during the shift-down operation, the engine revolution speed changes dramatically upon clutch engagement because the inertia of the vehicle forces the engine to rapidly accelerate under the condition of the accelerator pedal being completely released and thus the fuel being injected in a small amount. As a result, great deceleration (engine brake) acts onto the vehicle, and immediately a reaction takes place. Due to this, the engine revolution speed varies in a large amplitude.

According to the control of the present invention, the amount of fuel injection is slightly raised as the engine revolution speed change occurs. Therefore, the deceleration of the vehicle and its reaction are suppressed, and the engine revolution speed fluctuation and the back and forth movement of the vehicle is reduced. Consequently, the passengers in the vehicle do not experience uncomfortableness. Nevertheless, the amount of addition to the fuel injection is limited to the minimum since the engine brake is applying. The amount of first fuel injection $Q_{bsh}$ should be determined in view of this.

The same fuel injection control as described above may be realized by the driver if he/she can stamp and release the accelerator pedal appropriately. In reality, however, such manual (or foot) control of the accelerator pedal requires a high skill and is complicated. Thus, it is not practical. The present invention, on the other hand, provides the apparatus and method of automatically performing such control.

When the revolution speed change disappears and Flag=0 is established, $Q_{fnl}=Q_{base}$ holds true. Then, the condition of switching the switch 23 is no longer met. As a result, in the next control, it becomes "0" and the situation is returned to the initial condition.

The above control is diagramed in the flowchart of FIG. 2. At step 101, ECU 5 reads the basic amount of fuel injection $Q_{base}$ from the map M1. At step 102, ECU 5 also reads the amount of initial fuel injection $Q_{bsh}$ from the second map M2. At step 103, ECU 5 further reads the subtraction value $Q_{red}$ from the third map M3. At step 104, ECU 5 calculates $Q_{dmp}$ according to the equation of $Q_{dmp}=$ $Q_{shift}(-1)-Q_{red}$. At step 105, ECU 5 takes the smaller one of the initial value $Q_{bsh}$ and the reduced value $Q_{dmp}$ as the minimum amount of fuel injection $Q_{min}$.

At step 106, ECU 5 determines whether either $Q_{fnl}(-1)=Q_{bsh}(-1)$ or $Q_{fnl}(-1)=Q_{min}(-1)$ holds true. If neither relation is established, the program proceeds to step 107 to make $Q_{shift}=Q_{bsh}$. If one of the relation is established, on the other hand, the program proceeds to step 108 to make $Q_{shift}=Q_{min}$.

After that, at step 109, ECU 5 determines whether the shift flag is raised (Flag=1) or not. If Flag=1, $Q_{shift}$ is made the final value $Q_{shiftfnl}$ at step 110. If Flag=0, the final value $Q_{hiftfnl}$ becomes 0 at step 111. At step 112, the final value $Q_{shiftfnl}$ is compared with $Q_{base}$ and the larger one is taken as the target amount of fuel injection $Q_{fnl}$. Subsequently, at step 113, the current values $Q_{bsh}$, $Q_{min}$, $Q_{shift}$ and $Q_{fnl}$ are renamed to the previous values $Q_{bsh}(-1)$, $Q_{min}(-1)$, $Q_{shift}(-1)$ and $Q_{fnl}(-1)$ for use in the next control. The program is then terminated.

It should be recalled that the revolution speed change threshold value C$\Delta$Ne varies with the engine revolution speed Ne (map M4 in FIG. 3). In particular, this threshold value is small when the engine revolution speed Ne is high, as indicated in the map M4. This is because the higher the engine revolution speed Ne, the larger the shift shock upon clutch engagement. The amount of first fuel injection $Q_{bsh}$ is adjusted in accordance with the water temperature Tw because the minimum amount of fuel injection required for engine acceleration varies with the water temperature Tw.

It should be noted that the present invention is not limited to the above described embodiments. For instance, the present invention is applicable to a common rail type (accumulation type) fuel injection system.

The illustrated and described arrangement and method are disclosed in Japanese Patent Application No. 11-152500 filed on May 31, 1999 in JPO, the instant application claims priority of this Japanese Patent Application, and the entire disclosure thereof is incorporated herein by reference.

What is claimed is:

1. An apparatus for controlling an amount of fuel to be injected into a diesel engine, comprising:

a first sensor for determining whether change in engine revolution speed exceeds a predetermined range; and a controller for determining a target amount of fuel injection that is greater than a basic amount of fuel injection when the engine revolution speed change exceeds the predetermined amount and the change in the accelerator opening stays in the predetermined change.

2. The apparatus according to claim 1, wherein the first sensor determines whether the engine revolution speed change exceeds the predetermined value by comparing a filtered value of engine revolution speed change rate with a threshold value that changes with the engine revolution speed.

3. The apparatus according to claim 1, wherein the controller determines the target amount of fuel injection based on the engine revolution speed and temperature of water flowing in the engine.

4. The apparatus according to claim 2, wherein the controller determines the target amount of fuel injection based on the engine revolution speed and temperature of water flowing in the engine.

5. The apparatus according to claim 1, wherein the first sensor makes determination at prescribed intervals, and once the first sensor determines that the engine revolution speed change exceeds the predetermined value, a previous value of engine revolution speed change is also considered in a next determination.

6. The apparatus according to claim 2, wherein the threshold value takes a low value when the engine revolution speed is high.

7. The apparatus according to claim 1, wherein the controller determines a target amount of fuel injection greater the basic amount of fuel injection even after a clutch is disengaged.

8. The apparatus according to claim 1, wherein the basic amount of fuel injection is determined based on the engine revolution speed and the accelerator opening.

9. The apparatus according to claim 8, wherein the basic amount of fuel injection is determined further based on temperature of water flowing in the engine and temperature of intake air.

10. The apparatus according to claim 1, wherein the controller makes determination at prescribed intervals, and the target amount of fuel injection is reduced in a next determination every time the controller determines the target amount of fuel injection.

11. A method of controlling an amount of fuel to be injected into a diesel engine, comprising the steps of:

A) determining whether change in engine revolution speed exceeds a predetermined value;

B) determining whether change in an accelerator opening is within a predetermined range; and C) determining a target amount of fuel injection that is greater than a basic amount of fuel injection when the engine revolution speed change exceeds the predetermined amount and the change in the accelerator opening stays in the predetermined range.

* * * * *